United States Patent
Sato et al.

(10) Patent No.: US 10,802,269 B2
(45) Date of Patent: Oct. 13, 2020

(54) OPTICAL CIRCUIT, OPTICAL SCANNING DEVICE, OPTICAL MULTIPLEXER-DEMULTIPLEXER, WAVELENGTH MONITOR, OPTICAL MULTIPLEXER-DEMULTIPLEXER MODULE, AND WAVELENGTH MONITOR MODULE

(71) Applicant: Mitsubishi Electric Corporation, Tokyo (JP)

(72) Inventors: Yoshiya Sato, Tokyo (JP); Keita Mochizuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/095,768

(22) PCT Filed: Jul. 11, 2016

(86) PCT No.: PCT/JP2016/070464
§ 371 (c)(1),
(2) Date: Oct. 23, 2018

(87) PCT Pub. No.: WO2018/011868
PCT Pub. Date: Jan. 18, 2018

(65) Prior Publication Data
US 2020/0142184 A1    May 7, 2020

(51) Int. Cl.
*G02B 6/26* (2006.01)
*G02B 6/30* (2006.01)
(Continued)

(52) U.S. Cl.
CPC ......... *G02B 26/10* (2013.01); *G02B 6/12014* (2013.01)

(58) Field of Classification Search
CPC .................................... G02B 6/26; G02B 6/30
(Continued)

(56) References Cited

U.S. PATENT DOCUMENTS 6,266,460 B1 *  7/2001  Doerr ................. G02B 6/12019
                                                       385/16
6,421,478 B1 *  7/2002  Paiam ................ G02B 6/12014
                                                       385/24
(Continued)

FOREIGN PATENT DOCUMENTS

JP        2012-129259 A      7/2012
JP         2014-35377 A      2/2014

OTHER PUBLICATIONS

Yoshida et al., "Elephant Coupler: Vertically Curved Si Waveguide with Wide and Flat Wavelength Window Insensitive to Coupling Angle," Optical Communication (ECOC), 2015, ID: 1038, 3 pages.

*Primary Examiner* — Kaveh C Kianni
(74) *Attorney, Agent, or Firm* — Birch, Stewart, Kolasch & Birch, LLP

(57) ABSTRACT

An optical circuit includes an input waveguide, an arrayed waveguide including a plurality of output waveguides, a coupler, an electrode capable of applying a voltage to each of the output waveguides of the arrayed waveguide, and a chip unit to which the input waveguide, the coupler, and a portion of the arrayed waveguide are fixed. The arrayed waveguide is divided into a phase shifter portion capable of generating a predetermined phase difference between adjacent ones of the output waveguides, a beam portion having a cantilever structure that is not fixed by the chip unit, and a waveguide portion between the phase shifter portion and the beam portion. The electrode is capable of applying positive and negative voltages to the beam portion of the arrayed waveguide such that positive and negative voltages (Continued)

are alternately applied to adjacent ones of the output waveguides.

11 Claims, 8 Drawing Sheets

(51) Int. Cl.
    *G02B 26/10*     (2006.01)
    *G02B 6/12*     (2006.01)

(58) Field of Classification Search
    USPC .............................................................. 385/3
    See application file for complete search history.

(56) References Cited

U.S. PATENT DOCUMENTS

| | | | | |
|---|---|---|---|---|
| 6,587,615 | B1* | 7/2003 | Paiam | G02B 6/12014 385/24 |
| 6,807,372 | B1* | 10/2004 | Lee | G02B 6/12007 375/E1.002 |
| 6,922,510 | B2* | 7/2005 | Hatanaka | G02F 1/225 385/50 |
| 7,212,326 | B2* | 5/2007 | Wooten | G02F 1/225 359/237 |
| 8,270,792 | B1* | 9/2012 | Ng | G02B 6/12014 385/14 |
| 8,395,765 | B2 | 3/2013 | Mochizuki et al. | |
| 2002/0028045 | A1* | 3/2002 | Yoshimura | H01L 23/5389 385/50 |
| 2002/0102052 | A1* | 8/2002 | Thompson | G02B 6/12028 385/27 |
| 2003/0113067 | A1* | 6/2003 | Koh | G02B 6/43 385/48 |
| 2003/0123828 | A1* | 7/2003 | Garito | C08L 27/00 385/129 |
| 2004/0184750 | A1* | 9/2004 | Shahar | G02F 1/225 385/122 |
| 2004/0264836 | A1* | 12/2004 | Kawashima | G02F 1/025 385/14 |
| 2005/0195407 | A1* | 9/2005 | Nordin | G01N 21/7703 356/501 |
| 2005/0249509 | A1* | 11/2005 | Nagarajan | H01S 5/024 398/198 |
| 2006/0279734 | A1* | 12/2006 | Yan | G02B 6/12026 356/329 |
| 2007/0160321 | A1* | 7/2007 | Wu | G02B 6/12007 385/24 |
| 2008/0044122 | A1* | 2/2008 | Fondeur | G02B 6/12019 385/1 |
| 2008/0131053 | A1* | 6/2008 | Nara | G02B 6/12019 385/37 |
| 2010/0266276 | A1* | 10/2010 | Zheng | G02B 6/2804 398/43 |
| 2010/0266295 | A1* | 10/2010 | Zheng | H04J 14/0227 398/201 |
| 2012/0230690 | A1* | 9/2012 | Doerr | G02B 6/12033 398/49 |
| 2012/0230695 | A1* | 9/2012 | O'Krafka | G02B 6/43 398/87 |
| 2013/0209112 | A1* | 8/2013 | Witzens | G02B 6/423 398/214 |
| 2015/0378187 | A1* | 12/2015 | Heck | G01S 17/42 250/227.21 |
| 2017/0071510 | A1* | 3/2017 | Delbeke | A61B 5/1459 |

* cited by examiner

OPTICAL CIRCUIT, OPTICAL SCANNING DEVICE, OPTICAL MULTIPLEXER-DEMULTIPLEXER, WAVELENGTH MONITOR, OPTICAL MULTIPLEXER-DEMULTIPLEXER MODULE, AND WAVELENGTH MONITOR MODULE

FIELD

The present invention relates to an optical circuit, an optical scanning device, an optical multiplexer-demultiplexer, a wavelength monitor, an optical multiplexer-demultiplexer module, and a wavelength monitor module, each having multiple waveguides.

BACKGROUND

Optical waveguides formed on a planar lightwave circuit (PLC) or on a silicon substrate and optical multiplexer-demultiplexers such as an arrayed waveguide grating (hereinafter referred to as AWG) using optical waveguides are used, for example, in optical modules for use in optical communication devices. In recent years, an optical wavelength switch has been developed that combines an optical waveguide and a micro-electromechanical system (MEMS) mirror or nematic liquid crystal (Patent Literature 1).

In addition to photonic integrated circuits, optical transmission-reception modules are increasingly being reduced in size and having their levels of integration increased, and an integrated optical module has been developed that includes various optical components, such as a light-receiving/emitting element, an optical multiplexer-demultiplexer, and a lens, in a hermetically sealed single package. Patent Literature 2 discloses an ultra-small wavelength-tunable light source called a micro-integrable tunable laser assembly (ITLA). The micro-ITLA includes a laser array, a multimode interference (hereinafter referred to as MMI waveguide, an etalon, which includes parallel plates and is used for wavelength monitoring, and a photodiode (hereinafter referred to as PD), all integrated in a single package. Since an etalon has wavelength-dependent transmittance, observation of the intensity of light transmitted through an etalon using a PD provides a wavelength monitoring function.

Optical axis adjustment is critical in a photonic integrated circuit and in an integrated optical module. For example, to allow light to enter and exit from a single-mode optical waveguide with a high coupling efficiency, optical components need to be arranged with an accuracy as high as about 1 µm. In addition, because the optical characteristics of an etalon used as a wavelength monitor vary depending on the light incident angle, a micro-ITLA requires highly accurate adjustment of the incident light axis angle. Moreover, in view of correction of optical axis misalignment caused by aging and temperature variation and in view of application to projection displays, a mechanism for dynamically adjusting optical axes is also required. Patent Literature 1 discloses an optical axis adjustment mechanism that uses a MEMS mirror or nematic liquid crystal.

CITATION LIST

Patent Literature

Patent Literature 1: Japanese Patent Application Laid-open No. 2014-35377

Patent Literature 2: Japanese Patent Application Laid-open No. 2012-129259

SUMMARY

Technical Problem

Conventional optical scanning is performed using a MEMS mirror or nematic liquid crystal. Optical axis adjustment using a MEMS mirror or nematic liquid crystal changes the optic axial angle at a constant rate irrespective of the optical wavelength. In contrast, a wavelength monitor for use in a micro-ITLA can be expected to perform wavelength calibration with higher accuracy by slightly changing the angle of incident to the etalon depending on the wavelength, that is, by controlling wavelength dispersion of the optic axial angle, because the refractive index is dependent on the wavelength. In addition, if it is possible to dynamically control the wavelength dispersion, a tunable optical multiplexer-demultiplexer can be implemented. However, controlling the wavelength dispersion of an optic axial angle requires an optical component such as a diffraction grating in addition to an optical scanning section, thereby presenting a problem in that the size of the device is increased.

The present invention has been made in view of the foregoing, and it is an object of the present invention to provide an optical circuit configured to be capable of controlling wavelength dispersion of an optic axial angle to perform optical scanning while avoiding a size increase.

Solution to Problem

To solve the problem and achieve the object described above, an optical circuit according to an aspect of the present invention includes: an input waveguide serving as an optical transmission line; an arrayed waveguide including a plurality of output waveguides serving as an optical transmission line; a splitting unit to cause light input from the input waveguide to split and to output the light to the output waveguides of the arrayed waveguide; an electrode capable of applying a voltage to each of the output waveguides of the arrayed waveguide; and a chip unit to which the input waveguide, the splitting unit, and a portion of the arrayed waveguide are fixed. The arrayed waveguide is divided into a phase shifter portion capable of generating a predetermined phase difference between adjacent ones of the output waveguides, a beam portion having a light output surface from which the output waveguides output light and having a cantilever structure that is not fixed by the chip unit, and a waveguide portion between the phase shifter portion and the beam portion. The electrode is capable of applying positive and negative voltages to the beam portion of the arrayed waveguide such that positive and negative voltages are alternately applied to adjacent ones of the output waveguides.

Advantageous Effects of Invention

An optical circuit according to the present invention provides an advantage in being configured to be capable of controlling wavelength dispersion of an optic axial angle to perform optical scanning while avoiding a size increase.

DESCRIPTION OF EMBODIMENTS

An optical circuit, an optical scanning device, an optical multiplexer-demultiplexer, a wavelength monitor, an optical multiplexer-demultiplexer module, and a wavelength monitor module according to embodiments of the present invention will be described in detail below with reference to the drawings. Note that these embodiments are not intended to limit the scope of the present invention.

First Embodiment

Figure 1:
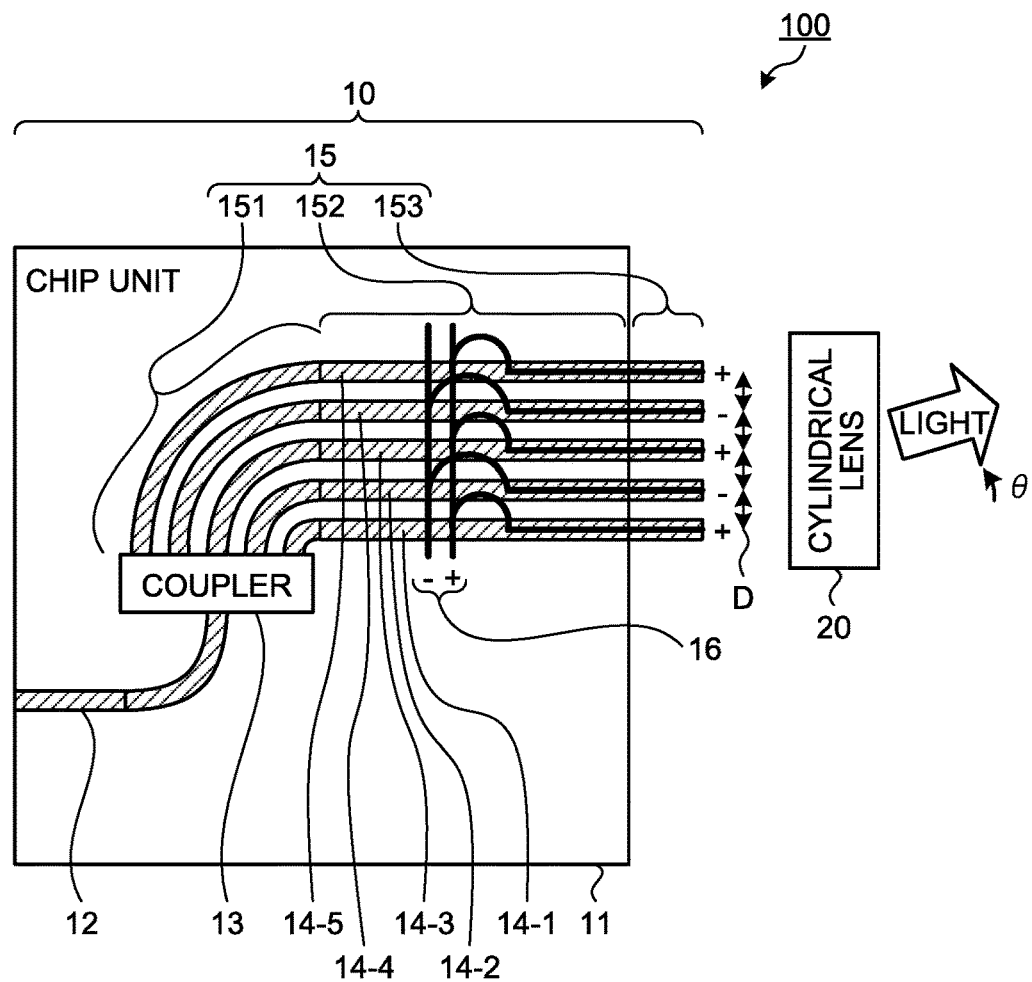
FIG. 1 is a diagram illustrating an example configuration of an optical scanning device including an optical circuit according to a first embodiment.

FIG. 1 is a diagram illustrating an example configuration of an optical scanning device 100 including an optical circuit 10 according to a first embodiment of the present invention. The optical scanning device 100 includes the optical circuit 10 that outputs light and a cylindrical lens 20 serving as a light correction lens. The optical circuit 10 includes a chip unit 11, an input waveguide 12, a coupler 13, an arrayed waveguide 15 including output waveguides 14-1 to 14-5, and an electrode 16.

The chip unit 11 is formed of a material or materials such as Si, $SiO_2$, a compound semiconductor, or a polymer, and fixes the input waveguide 12, the coupler 13, and a portion of the arrayed waveguide 15. Although FIG. 1 illustrates the input waveguide 12, the coupler 13, and a portion of the arrayed waveguide 15 as being fixed on the chip unit 11, the input waveguide 12, the coupler 13, and a portion of the arrayed waveguide 15 may be configured to be encapsulated and fixed in the chip unit 11.

The input waveguide 12 is an optical transmission line that receives light output from a light-emitting unit such as an external laser diode (hereinafter referred to as LD) not illustrated, and directs the light into the optical circuit 10.

The coupler 13 is a splitting unit that causes the light that is input from the input waveguide 12 to split and outputs the light to each of the output waveguides 14-1 to 14-5 of the arrayed waveguide 15. The coupler 13 is a 1×N coupler, and is a 1×5 coupler (N=5) in the example of FIG. 1. The coupler 13 is, for example, a set of cascaded slab waveguide splitters, cascaded MMI waveguide splitters, or cascaded Y-shaped waveguide splitters.

The output waveguides 14-1 to 14-5 are each an optical transmission line that outputs, to the cylindrical lens 20, the light that is input from the coupler 13. The output waveguides 14-1 to 14-5 may also be referred to simply as output waveguides 14 when it is not necessary to distinguish between them.

The arrayed waveguide 15 includes the output waveguides 14-1 to 14-5. Note that each of the output waveguides 14-1 to 14-5 includes a single waveguide, and the arrayed waveguide 15 is divided into three portions based on the positions in the optical circuit 10. The arrayed waveguide 15 is divided into three portions, i.e., a phase shifter portion 151, a waveguide portion 152, and a beam portion 153, based on the positions in the optical circuit 10 or the shape of the portions.

The phase shifter portion 151 can generate a predetermined phase difference between adjacent ones of the output waveguides 14. As illustrated in FIG. 1, in the phase shifter portion 151 of the arrayed waveguide 15, each of the output waveguides 14 that constitute the arrayed waveguide 15 has a curved portion, thereby generating a travel distance difference L between adjacent ones of the output waveguides 14. The space between adjacent ones of the output waveguides 14 has an arc shape whose center is at a certain point on the chip unit 11. For example, if the arrayed waveguide 15 is configured such that adjacent ones of the output waveguides 14 having a spacing "a" therebetween are coaxially curved by an angle of $\varphi$ rad, the travel distance difference L between adjacent ones of the output waveguides 14 will be $L=a\varphi$. In the arrayed waveguide 15, the travel distance difference L in the output waveguides 14 generates a phase difference between adjacent ones of the output waveguides 14, thereby causing the phase shifter portion 151 having a curved shape as illustrated in FIG. 1 to function as a phase shifter.

The beam portion 153 includes a light output surface from which the output waveguides 14-1 to 14-5 output light, and is a portion, of the arrayed waveguide 15, having a cantilever structure that is not fixed by the chip unit 11. In the arrayed waveguide 15, the portion of the beam portion 153 not fixed by the chip unit 11 is wet etched.

The waveguide portion 152 is a portion between the phase shifter portion 151 and the beam portion 153 in the arrayed waveguide 15.

The electrode 16 is capable of applying a voltage to each of the output waveguides 14-1 to 14-5 of the arrayed waveguide 15. The electrode 16 is laid on the chip unit 11 to be capable of applying positive and negative voltages to the beam portion 153 of the arrayed waveguide 15 such that positive and negative voltages are alternately applied to adjacent ones of the output waveguides 14. Regarding the length of the electrode 16, FIG. 1 illustrates the electrode 16 as extending over the entire length of the beam portion 153 and over a part of the waveguide portion 152, but the electrode 16 only needs to have a length enough to apply a voltage to the beam portion 153. The optical circuit 10 does not include a power supply for applying a voltage to the electrode 16, but is configured such that a voltage is applied to the electrode 16 from a device external to the optical circuit 10.

Figure 2:
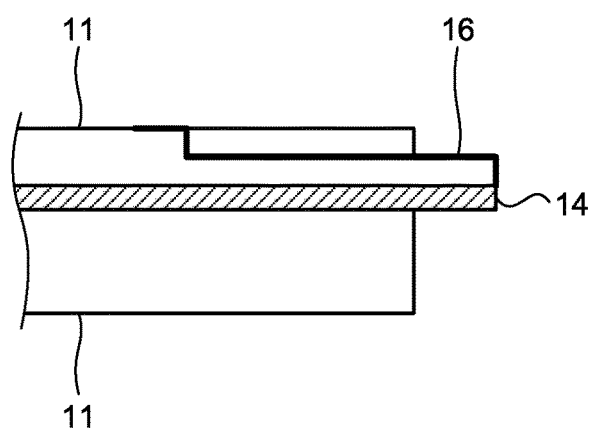
FIG. 2 is a diagram illustrating a conceptual positional relationship between the output waveguides and the electrode in a structure in which the chip unit encapsulates components in the optical circuit according to the first embodiment.

The electrode 16 of the example of FIG. 1 is laid on the output waveguides 14-1 to 14-5 of the arrayed waveguide 15, but if the chip unit 11 encapsulates these components, the electrode 16 may apply a voltage to the output waveguides 14-1 to 14-5 of the arrayed waveguide 15 through the chip unit 11. FIG. 2 is a diagram illustrating a conceptual positional relationship between the output waveguides 14 and the electrode 16 in a structure in which the chip unit 11 encapsulates these components in the optical circuit 10 according to the first embodiment. FIG. 2 is a diagram illustrating a portion corresponding to a cross section of a portion including the output waveguides 14 in the optical circuit 10 of FIG. 1. The output waveguides 14 and the electrode 16 are arranged as being sandwiched within the chip unit 11. The electrode 16 is not in direct contact with the output waveguides 14, but applies a voltage to the output waveguides 14 through the chip unit 11. This configuration allows the light to be confined in the output waveguides 14 in the optical circuit 10, thereby reducing or preventing light absorption in the electrode 16.

Light output from the beam portion 153 of the optical circuit 10 spreads in directions on the chip plane. Thus, the optical scanning device 100 uses the cylindrical lens 20 to correct the horizontal to vertical ratio of the light.

Figure 3:
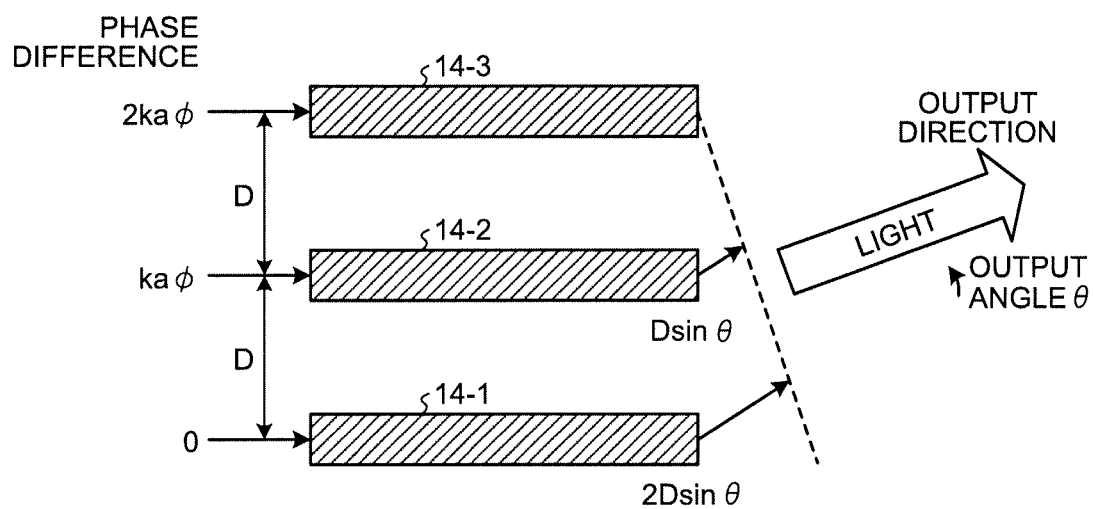
FIG. 3 is a diagram illustrating a phase difference at output waveguides and a light output direction in the optical circuit according to the first embodiment.

Optical characteristics of the optical circuit 10 of the first embodiment will next be described. In the optical circuit 10, light entering from the input waveguide 12 is caused to split in the coupler 13 to be directed to the output waveguides 14-1 to 14-5 of the arrayed waveguide 15. In the arrayed waveguide 15, propagation of light in the phase shifter portion 151 generates a phase difference kL in the light between adjacent ones of the output waveguides 14, where k represents the wave number of the light propagating in the optical circuit 10. The value of k depends on the refractive index, the width of the output waveguides 14, the optical angular frequency ω, and the like. It should be noted that the output waveguides 14 having different radii of curvature technically result in different effective refractive indices and different group velocities. FIG. 3 is a diagram illustrating the phase difference at the output waveguides 14-1 to 14-3 and the light output direction in the optical circuit 10 according to the first embodiment. For simplicity of illustration, the electrode 16 is omitted. As illustrated in FIG. 3, the optical circuit 10 has a phase difference of kaφ between adjacent ones of the output waveguides 14 at the time the light reaches the beam portion 153 of the arrayed waveguide 15. In addition, there is an optical path difference of D sin θ between adjacent ones of the output waveguides 14. The optical circuit 10 outputs light from the beam portion 153 of the arrayed waveguide 15 in an output direction at an output angle of θ that satisfies a constructive interference condition with respect to the above phase difference. This constructive interference condition can be expressed by Formula (1) below.

[Formula 1]

$$kL - k_0 D \sin \theta = 2m\pi \quad (1)$$

The parameter $k_0$ represents the wave number in the air, which generally differs from the wave number k in the optical circuit 10. The parameter D represents the spacing between adjacent ones of the output waveguides 14. The parameters k and $k_0$ are each a function of the optical angular frequency ω, and can be represented using the optical group velocity $v_g$ in the waveguide and the velocity of light in the air "c" as Formulas (2) and (3). The optical group velocity $v_g$ can be represented as Formula (4).

[Formula 2]

$$k \cong \frac{\omega - \Omega}{v_g} \quad (2)$$

[Formula 3]

$$k_0 = \omega/c \quad (3)$$

[Formula 4]

$$v_g \stackrel{def}{=} \frac{d\omega}{dk} \quad (4)$$

The relation between the optical angular frequency ω and the wave number, such as those shown in Formulas (2) and (3), is referred to as dispersion relation. The parameter Ω corresponds to the intercept of the approximate formula of dispersion relation for the waveguide, and generally depends on the width, the height, and the refractive index of the output waveguides 14. By substituting Formulas (2) and (3) into Formula (1), Formula (1) can be rearranged to Formula (5), where m is an integer.

[Formula 5]

$$\left(\frac{L}{v_g} - \frac{D \sin \theta}{c}\right)\omega - \frac{\Omega}{v_g}L = 2m\pi \quad (5)$$

A change in the optical angular frequency ω changes the output angle θ that satisfies Formula (5) representing the constructive interference condition. That is, the output optic axial angle changes according to the optical angular frequency ω of input light. This is a part of basic principle of AWG.

Under this condition, in the present embodiment, application of a voltage to the electrode 16 in the optical circuit 10 causes an electrical charge to accumulate in the output waveguides 14 in the beam portion 153 of the arrayed waveguide 15, and thus the output beam spacing D changes due to the electrostatic pressure. Formula (5) above shows that a change in the output beam spacing D can change the output angle θ accordingly. This control enables the optical circuit 10 to provide optical scanning. Quantitatively, total differential of Formula (5) results in Formula (6).

[Formula 6]

$$\left(\frac{L}{v_g} - \frac{D \sin \theta}{c}\right)d\omega - \frac{\omega}{c}\sin \theta dD = \frac{\omega}{c}D\cos\theta d\theta \quad (6)$$

A change in the output beam spacing D under a constant optical angular frequency ω changes the output angle θ as expressed by Formula (7).

[Formula 7]

$$\frac{\partial \theta}{\partial D} = -\frac{\tan \theta}{D} \quad (7)$$

Figure 4:
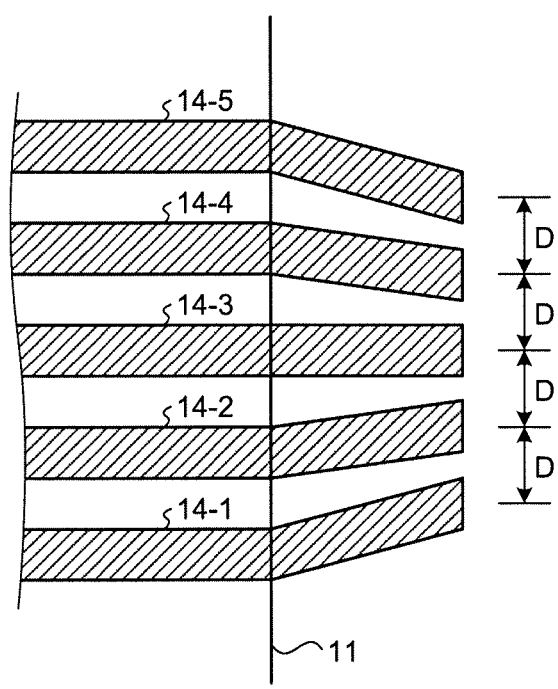
FIG. 4 is a diagram illustrating an example of change in the output beam spacing of the output waveguides in the beam portion of the optical circuit according to the first embodiment.

FIG. 4 is a diagram illustrating an example of change in the output beam spacing D of the output waveguides 14 in the beam portion 153 of the optical circuit 10 according to the first embodiment. For simplicity of illustration, the electrode 16 is omitted. As described above, positive and negative voltages are applied to the beam portion 153 by the electrode 16 such that positive and negative voltages are alternately applied to adjacent ones of the output waveguides 14. In the beam portion 153, this operation maintains the spacing in portions nearer to the chip unit 11, but reduces the output beam spacing D in portions nearer to the light output surface that are free ends of the cantilever structure. In the optical circuit 10, changing the voltage applied to the electrode 16 can change the output beam spacing D in portions nearer to the light output surface of the beam portion 153. Note that a change in the output beam spacing D also cause the directions of the output waveguides 14 in the beam portion 153 to be different as illustrated in FIG. 4. However, as described above, the light output from the beam portion 153 of the optical circuit 10 originally spreads in directions on the chip plane. Thus, even if the directions of the light output from the output waveguides 14 are different, it will not cause a problem when performing optical scanning as long as the output beam spacing D at the light output surface can be controlled.

As described above, according to the present embodiment, the optical circuit 10 includes the electrode 16 capable of applying a voltage to each of the output waveguides 14 of the arrayed waveguide 15, and the electrode 16 is capable of applying positive and negative voltages to the beam portion 153 of the arrayed waveguide 15 such that positive and negative voltages are alternately applied to adjacent ones of the output waveguides 14. This configuration enables the optical circuit 10 to change the output beam spacing D in portions nearer to the light output surface of the beam portion 153 by changing the voltage applied by the electrode 16 to the beam portion 153. Thus, the optical circuit 10 is configured to be capable of controlling wavelength dispersion of the optic axial angle to perform optical scanning while avoiding a size increase of the circuit.

Second Embodiment

A second embodiment will be described below in terms of an example of the output beam spacing D.

The optical circuit 10 is configured similarly to the first embodiment. In the second embodiment, the output beam spacing D satisfies the relationship of Formula (8) below.

[Formula 8]

$$2(m-1)\pi < \left(\frac{L}{v_g} - \frac{D}{c}\right)\omega - \frac{\Omega}{v_g}L < \quad (8)$$

$$2m\pi < \left(\frac{L}{v_g} + \frac{D}{c}\right)\omega - \frac{\Omega}{v_g}L < 2(m+1)\pi$$

Among others, a typical example includes a case of $\omega D/c < \pi$, that is, a case in which the output beam spacing D is less than a half of the wave number $\lambda$ in the air (D<0.5$\lambda$).

When Formula (8) is satisfied, then the value of the output angle θ that satisfies Formula (5) is uniquely determined. That is, the light output from the output waveguide 14 does not travel in multiple directions, but travels in one direction. This enables the optical circuit 10 to reduce optical loss.

Third Embodiment

A third embodiment will be described below in terms of an example of the travel distance difference L between adjacent ones of the output waveguides 14 generated in the phase shifter portion 151.

The optical circuit 10 is configured similarly to the first embodiment. The third embodiment assumes that the optical circuit 10 is designed such that the travel distance difference L satisfies Formulas (9) and (10) below, where n is an integer.

[Formula 9]

$$\frac{\Omega}{v_g}L = 2n\pi \quad (9)$$

[Formula 10]

$$-2\pi < \left(\frac{L}{v_g} - \frac{D}{c}\right)\omega < 0 < \left(\frac{L}{v_g} + \frac{D}{c}\right)\omega < 2\pi \quad (10)$$

The parameters $v_g$ and $\Omega$ respectively correspond to the slope and the intercept of the dispersion relation of the output waveguides 14. If Formulas (9) and (10) are satisfied, the output angle θ satisfying Formula (5) of constructive interference condition needs to satisfy Formula (11).

[Formula 11]

$$\sin\theta = \frac{cL}{v_g D} \quad (11)$$

This indicates that the output angle θ is constant irrespective of the optical angular frequency ω. Formula (11) also shows that the output angle θ under this condition depends on the output beam spacing D. Thus, in the optical circuit 10, application of a voltage to the electrode 16 to change the output beam spacing D enables optical scanning to be performed in the same direction on light having any optical angular frequency ω.

For example, a design using parameters D=0.5$\lambda_1$ and L=0.13$\lambda_1 \times v_g/c$ for a certain wavelength $\lambda_1$ and a certain optical angular frequency $\omega_1$ (=2πc/$\lambda_1$) satisfies Formula (8) in a wavelength band near $\lambda_1$. In addition, if $\Omega = \omega_1/0.13$, Formula (7) is satisfied. In this case, Formula (5) can be rewritten as Formula (12) below.

[Formula 12]

$$2\pi\left\{(0.13 - 0.5\sin\theta)\frac{\omega}{\omega_1} - 1\right\} = 2m\pi \quad (12)$$

This enables the output angle of θ=15.07 degrees to satisfy Formula (5) of constructive interference condition for light having any optical angular frequency ω. Then, application of a voltage to the electrode 16 to reduce the output beam spacing D by 5% allows Formula (5) to be rewritten as Formula (13) below.

[Formula 13]

$$2\pi\left\{(0.13 - 0.475\sin\theta)\frac{\omega}{\omega_1} - 1\right\} = 2m\pi \qquad (13)$$

In this situation, the output angle of θ=15.88 degrees satisfies Formula (5) for light having any optical angular frequency ω. This indicates that reduction of the output beam spacing D by 5% can provide optical scanning of 0.8 degrees for light having any wavelength.

Fourth Embodiment

A fourth embodiment will be described below for a case in which a heating electrode heater is disposed in the phase shifter portion 151.

Figure 5:
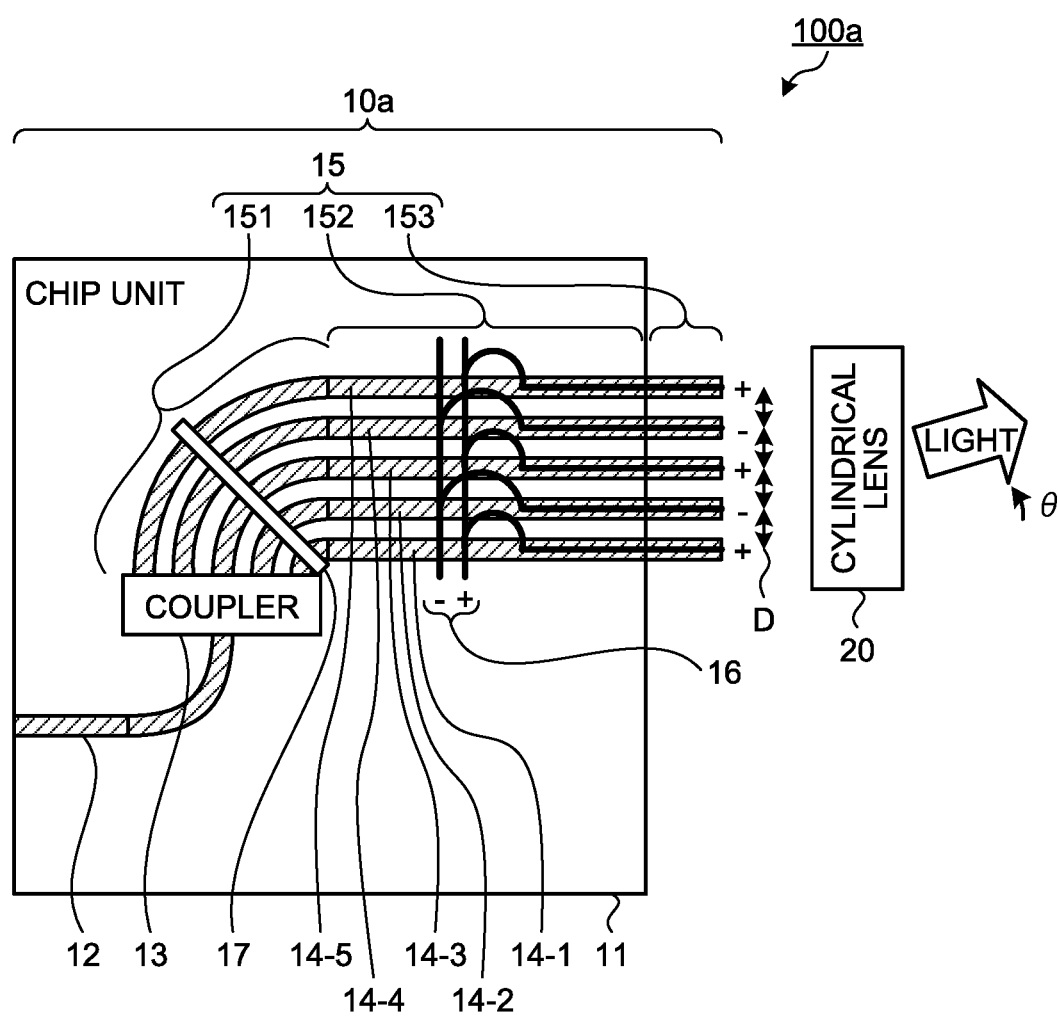
FIG. 5 is a diagram illustrating an example configuration of an optical scanning device including an optical circuit according to a fourth embodiment.

FIG. 5 is a diagram illustrating an example configuration of an optical scanning device 100a including an optical circuit 10a according to the fourth embodiment. The optical circuit 10a replaces the optical circuit 10 of the optical scanning device 100 of the first embodiment. The optical circuit 10a includes a heating electrode heater 17 in addition to the components of the optical circuit 10. The optical circuit 10a does not include a power supply for applying a voltage to the heating electrode heater 17, but is configured such that a voltage is applied to the heating electrode heater 17 from a device external to the optical circuit 10a.

The heating electrode heater 17 heats the output waveguides 14 in the phase shifter portion 151 to change the temperature of the output waveguides 14. Changing the temperature of the output waveguides 14 by the heating electrode heater 17 changes the refractive index of the output waveguides 14 due to a thermo-optic effect, thereby shifting the dispersion relation of the output waveguides 14 to adjust the intercept Ω of the dispersion relation. This enables the optical circuit 10a to adjust the output angle θ that satisfies Formula (5) of constructive interference condition.

Fifth Embodiment

In a fifth embodiment, the heating electrode heater used in relation to the fourth embodiment has an arrangement or shape asymmetric with respect to the widthwise direction of the output waveguides.

Figure 6:
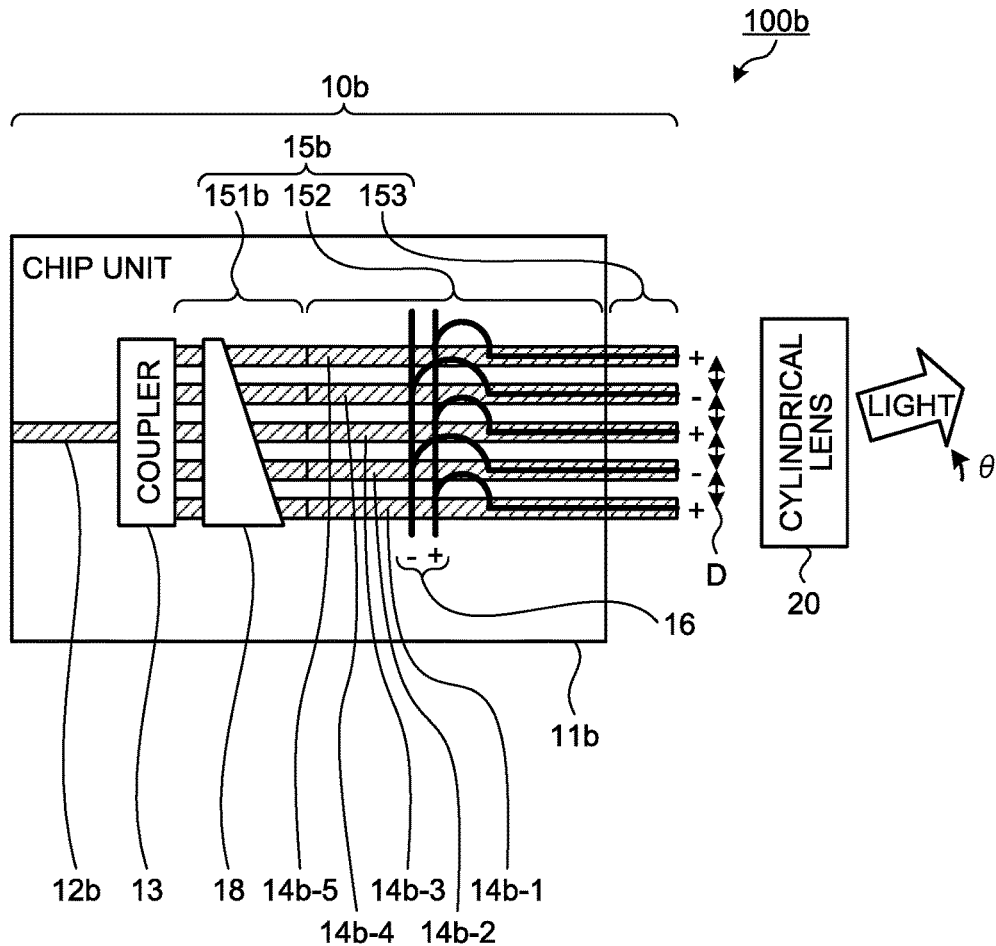
FIG. 6 is a diagram illustrating an example configuration of an optical scanning device including an optical circuit according to a fifth embodiment.

FIG. 6 is a diagram illustrating an example configuration of an optical scanning device 100b of an optical circuit 10b according to the fifth embodiment. The optical circuit 10b replaces the optical circuit 10 of the optical scanning device 100 of the first embodiment. The optical circuit 10b replaces the chip unit 11, the input waveguide 12, and the arrayed waveguide 15 including the output waveguides 14-1 to 14-5 respectively with a chip unit 11b, an input waveguide 12b, and an arrayed waveguide 15b including output waveguides 14b-1 to 14b-5, and additionally includes a heating electrode heater 18. The output waveguides 14b-1 to 14b-5 may also be referred to simply as output waveguides 14b when it is not necessary to distinguish between them. The optical circuit 10b does not include a power supply for applying a voltage to the heating electrode heater 18, but is configured such that a voltage is applied to the heating electrode heater 18 from a device external source to the optical circuit 10b.

The chip unit 11b is formed of similar material(s) to the chip unit 11, but has a smaller area than the area of the chip unit 11. The input waveguide 12b is configured similarly to the input waveguide 12, but has a length shorter than the length of the input waveguide 12. The output waveguides 14b-1 to 14b-5 are configured, respectively, similarly to the output waveguides 14-1 to 14-5, but have lengths shorter than the lengths of the output waveguides 14-1 to 14-5 and have no portions of curved waveguide corresponding to the portion of the phase shifter portion 151. The arrayed waveguide 15b includes, in place of the phase shifter portion 151, a phase shifter portion 151b that uses the heating electrode heater 18. The heating electrode heater 18 heats the output waveguides 14b in the phase shifter portion 151b to change the temperature of the output waveguides 14b. The heating electrode heater 18 has a portion for heating the output waveguides 14b, and the portion has a different length for each of the output waveguides 14.

The optical circuit 10b can provide a temperature difference and thus a refractive index difference between adjacent ones of the output waveguides 14b in the phase shifter portion 151b by the heating electrode heater 18. This enables the optical circuit 10b to implement the phase shifter portion 151b in the output waveguides 14b without using a curved waveguide. Since no curved waveguide is used, the optical circuit 10b is expected to have a reduced size. In addition, multi-channel integration can be expected in optical communication by using an optical communication module or the like including the optical circuit 10b having a reduced size.

Although the optical circuit 10b in the example of FIG. 6 is illustrated as being smaller in size than the optical circuits 10 and 10a, the optical circuit 10b is not limited thereto. The optical circuit 10a may use the heating electrode heater 18 instead of the heating electrode heater 17.

Sixth Embodiment

A sixth embodiment will be described below for a case in which the beam portion has a shape of a perpendicularly curved waveguide where the light output surface is perpendicular to the chip unit.

Figure 7:
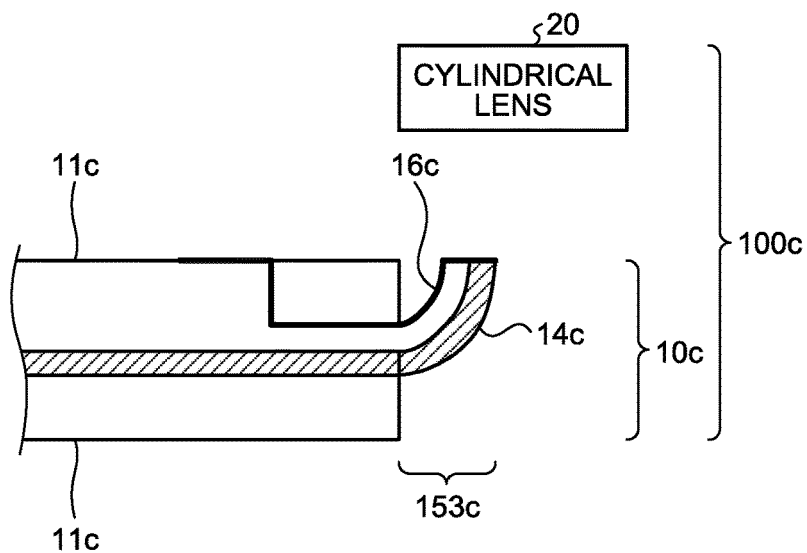
FIG. 7 is a diagram illustrating the shape of a beam portion in an optical circuit and a conceptual positional relationship of the cylindrical lens according to a sixth embodiment.

FIG. 7 is a diagram illustrating the shape of a beam portion 153c of an optical circuit 10c and a conceptual positional relationship of the cylindrical lens 20 in an optical scanning device 100c according to the sixth embodiment. As illustrated in FIG. 7, output waveguides 14c in the beam portion 153c each have a shape of a perpendicularly curved waveguide where the light output surface is perpendicular to a chip unit 11c. That is, the output waveguides 14c in the beam portion 153c each have a shape of a perpendicularly curved waveguide where the light output surface is perpendicular to the phase shifter portion 151 and the waveguide portion 152 both being fixed to the chip unit 11c. The optical circuit 10c is configured similarly to the optical circuit 10 except for the shape in the beam portion 153c, and therefore, FIG. 7 omits the portions common to the optical circuit 10. Note that, for ease of comparison with FIG. 2, FIG. 7 illustrates the output waveguides 14c and an electrode 16c as being sandwiched within the chip unit 11c.

The output waveguides 14c, the electrode 16c, and the chip unit 11c are configured, respectively, similarly to the output waveguides 14, to the electrode 16, and to the chip unit 11 except that the beam portion 153c has a shape adapted for the perpendicularly curved waveguides. In addition, the optical circuit 10c including the output waveguides 14c, the electrode 16c, and the chip unit 11c is configured similarly to the optical circuit 10 except that the beam portion 153c has a shape adapted for the perpendicularly curved waveguides.

In the optical circuit 10c, use of the perpendicularly curved waveguides in the beam portion 153c enables the optical circuit 10c to output light also from the center of the chip unit 11c rather than from the end surface of the chip unit 11c. Therefore, light output ports can be expected to have a higher density in the optical circuit 10c.

Seventh Embodiment

A seventh embodiment will be described below in terms of the configuration of an optical multiplexer-demultiplexer including the optical scanning device 100.

Figure 8:
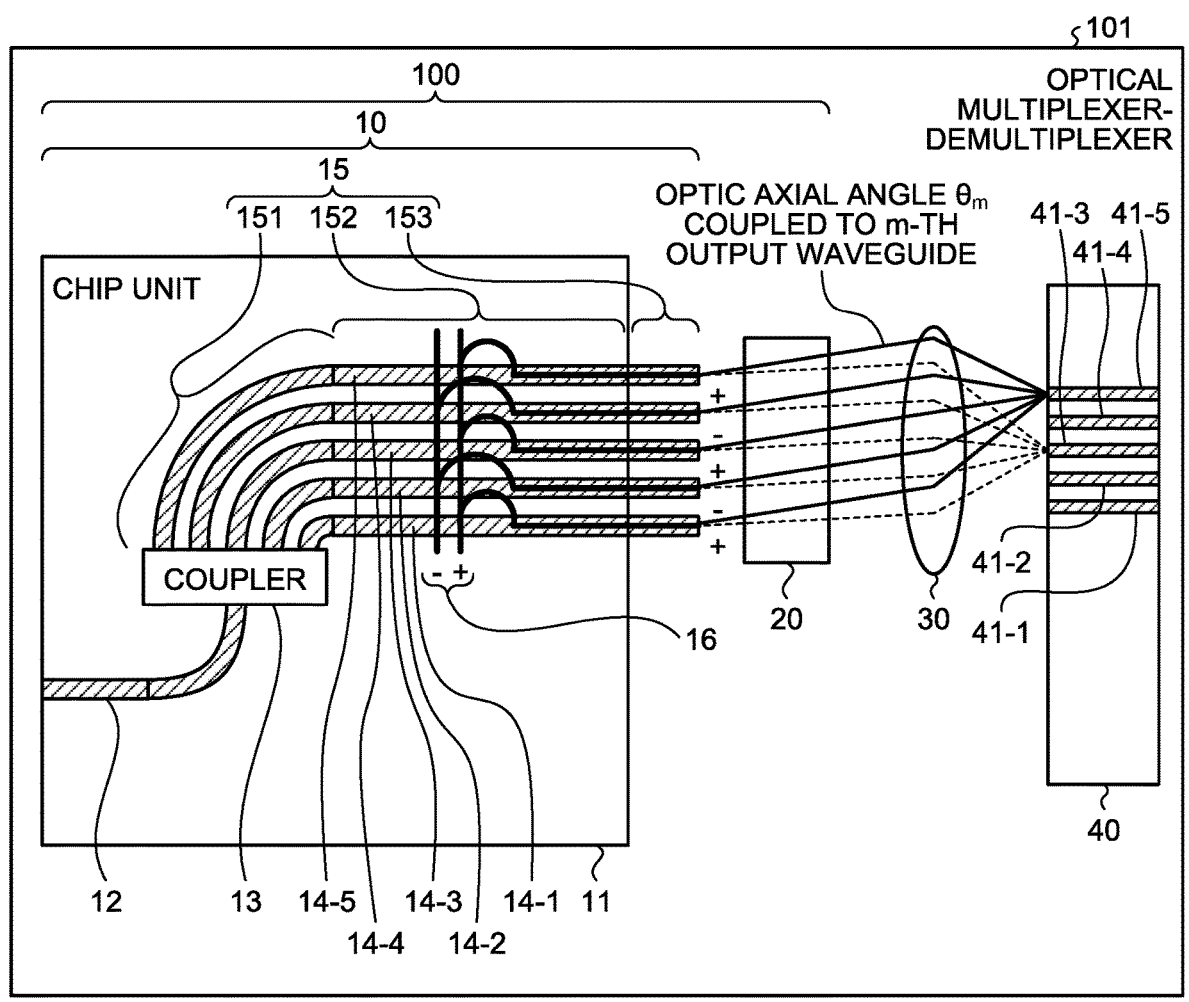
FIG. 8 is a diagram illustrating an example configuration of an optical multiplexer-demultiplexer according to a seventh embodiment.

FIG. 8 is a diagram illustrating an example configuration of an optical multiplexer-demultiplexer 101 according to the seventh embodiment. The optical multiplexer-demultiplexer 101 includes the optical scanning device 100, a condenser lens 30, and an arrayed waveguide 40 including waveguides 41-1 to 41-5. The waveguides 41-1 to 41-5 may also be referred to simply as waveguides 41 when it is not necessary to distinguish between them. The condenser lens 30 condenses collimated light converted by passing through the cylindrical lens 20 into the waveguides of the arrayed waveguide 40. The arrayed waveguide 40 includes multiple waveguides, each serving as a transmission line for light that has passed though the condenser lens 30. The condenser lens 30 and the arrayed waveguide 40 are disposed ahead of the cylindrical lens 20 in the travel direction of the light output from the optical circuit 10. As used herein, the arrayed waveguide 15 is referred to as first arrayed waveguide, while the arrayed waveguide 40 is referred to as second arrayed waveguide.

In this example, the collimated light to be coupled to each of the waveguides 41-1 to 41-5 of the arrayed waveguide 40 has a constant output angle. Assuming that the optic axial angle of the light to be coupled to the m-th waveguide 41 is $\theta_m$ and the optical angular frequency of the light to be coupled to the m-th waveguide 41 is $\omega_m$, the interval between the angular frequencies of the light to be coupled to the corresponding waveguides 41 can be expressed as Formula (14) below based on Formula (6).

[Formula 14]

$$\frac{\omega_{m+1} - \omega_m}{\omega} \cong \frac{v_g D \cos\theta_m}{cL - v_g D \sin\theta_m}(\theta_{m+1} - \theta_m) \quad (14)$$

As described above, since the optical circuit 10 can change the output beam spacing D by applying a voltage to the electrode 16, the interval between the optical angular frequencies described above can be changed. That is, the optical multiplexer-demultiplexer 101 illustrated in FIG. 8 can function as an optical multiplexer-demultiplexer capable of controlling the interval between the channels to be coupled to the waveguides 41.

Eighth Embodiment

An eighth embodiment will be described below in terms of a configuration of a wavelength monitor including the optical scanning device 100.

Figure 9:
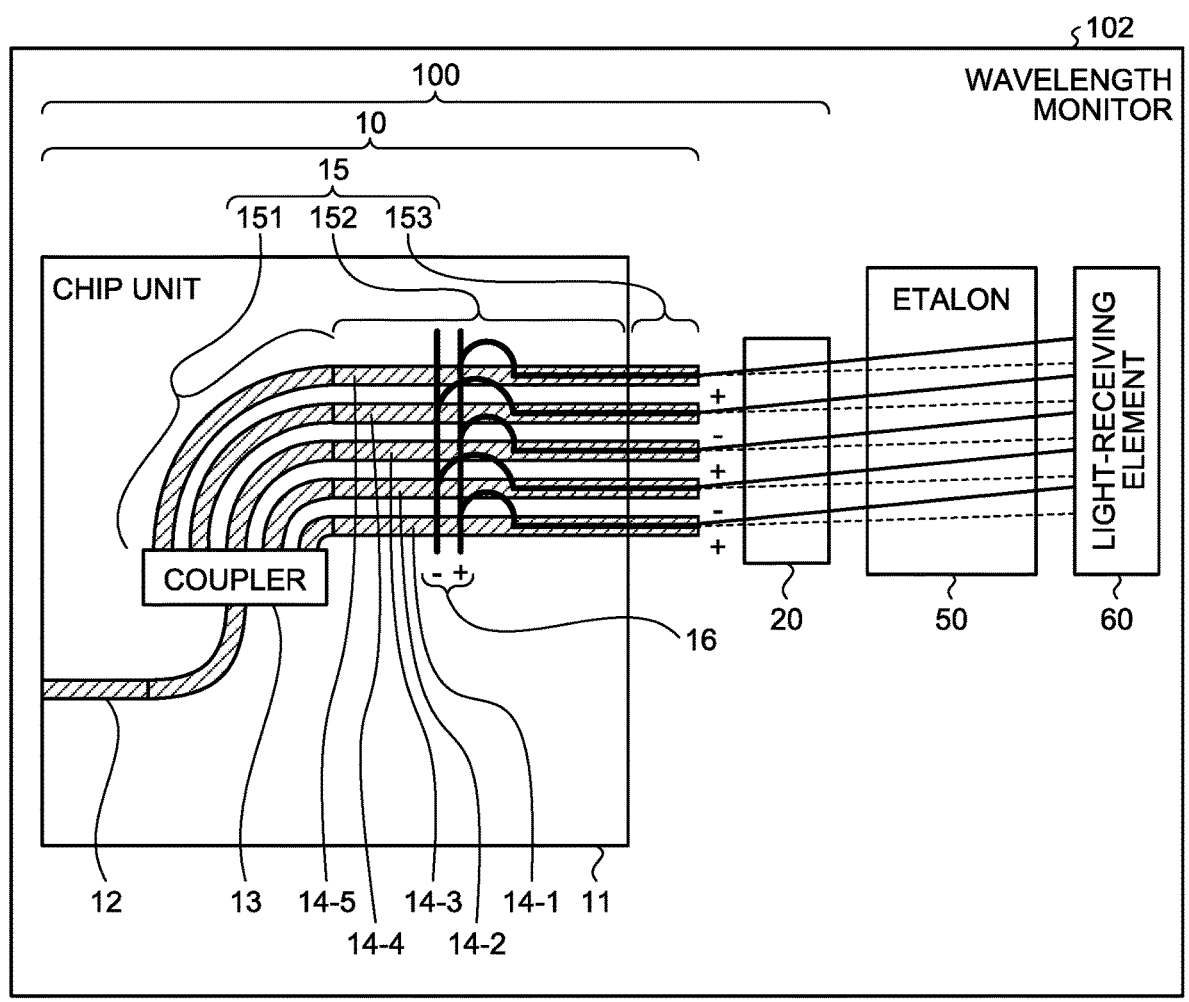
FIG. 9 is a diagram illustrating an example configuration of a wavelength monitor according to an eighth embodiment.

FIG. 9 is a diagram illustrating an example configuration of a wavelength monitor 102 according to the eighth embodiment. The wavelength monitor 102 includes the optical scanning device 100, an etalon 50, and a light-receiving element 60. The etalon 50 is a set of parallel plates that transmits the light that has passed through the cylindrical lens 20 and has a transmittance that varies depending on the wavelength of input light. The light-receiving element 60 receives light that has passed through the etalon 50 to observe the intensity of the light that has passed through the etalon 50. Generally, due to variation of the transmittance of the etalon 50 depending on the wavelength of input light, observation of the intensity of light transmitted through the etalon 50 using the light-receiving element 60 enables the wavelength to be observed. The wavelength monitor 102 using the etalon 50 uses a method of shifting the transmission spectrum of the etalon 50 by changing the temperature of the etalon 50 to perform accurate calibration of wavelength.

This temperature control determines the response speed and accuracy of the wavelength monitor 102. The eighth embodiment utilizes the fact that the transmission spectral characteristic of the etalon 50 varies depending on the incident optic axial angle. The optical circuit 10 utilizes application of a voltage to the electrode 16 to adjust the angle of incident to the etalon 50. This operation enables the wavelength monitor 102 to provide fast calibration without the need to use a temperature change of the etalon 50.

Ninth Embodiment

A ninth embodiment will be described below in terms of a method for fixing the beam portion 153.

Figure 10:
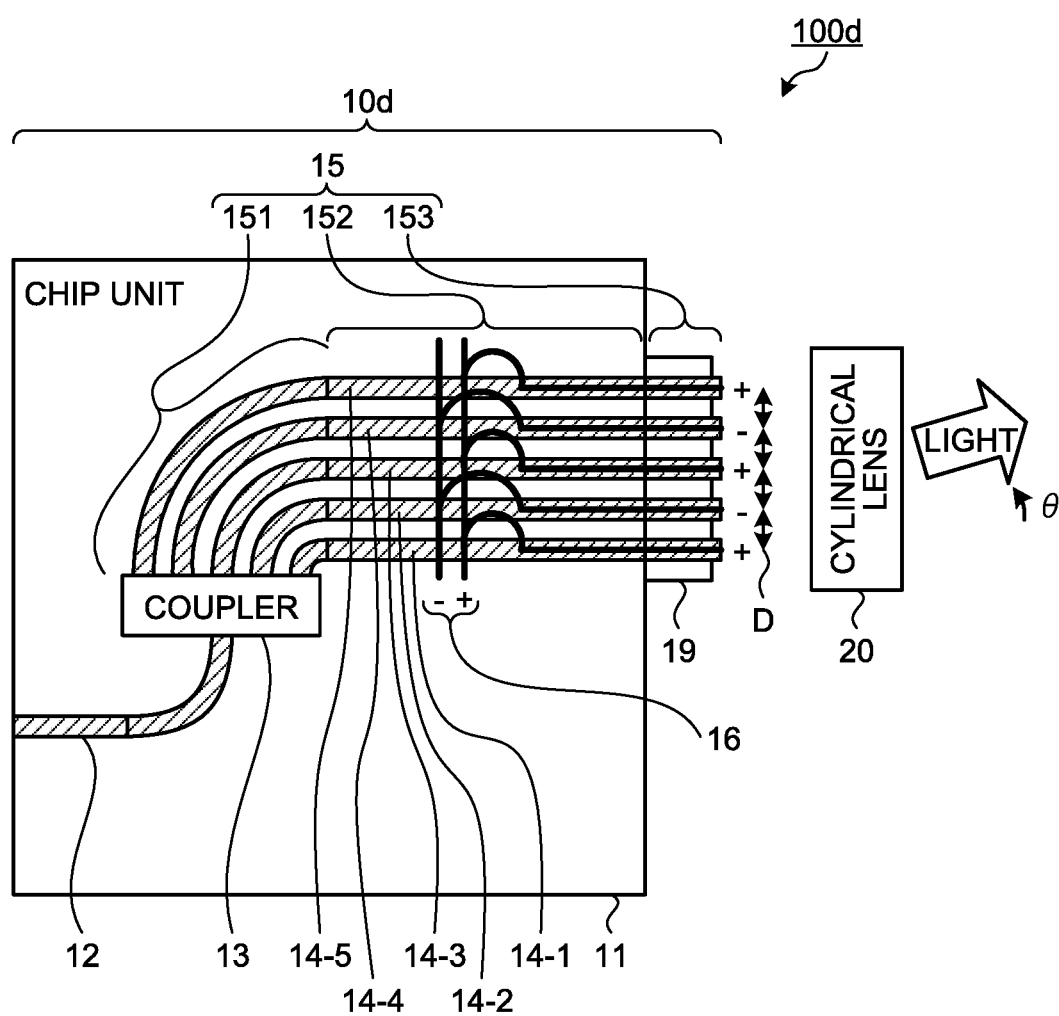
FIG. 10 is a diagram illustrating an example configuration of an optical scanning device including an optical circuit according to a ninth embodiment.

FIG. 10 is a diagram illustrating an example configuration of an optical scanning device 100d including an optical circuit 10d according to the ninth embodiment. The optical circuit 10d replaces the optical circuit 10 of the optical scanning device 100 of the first embodiment. The optical circuit 10d includes a fixture unit 19 in addition to the components of the optical circuit 10. The fixture unit 19 is a structure in which a portion of the beam portion 153 is embedded in resin and fixes the beam portion 153. The fixture unit 19 is assumed to be formed such that ultra violet (UV)-curable adhesive is applied to the beam portion 153, a voltage is applied to the electrode 16 to align the optical axes, and UV radiation is then emitted to cure the UV-curable adhesive, i.e., the resin, while a voltage is being applied to the electrode 16 with the optical axes aligned in a desired manner.

Fixing the beam portion 153 in place by curing resin in such a manner enables the optical circuit 10d to maintain the optical axes in alignment even when the voltage is no longer applied to the electrode 16.

Tenth Embodiment

A tenth embodiment will be described for cases in which the optical multiplexer-demultiplexer 101 of the seventh embodiment and the wavelength monitor 102 of the eighth embodiment are each configured to form a module.

Figure 11:
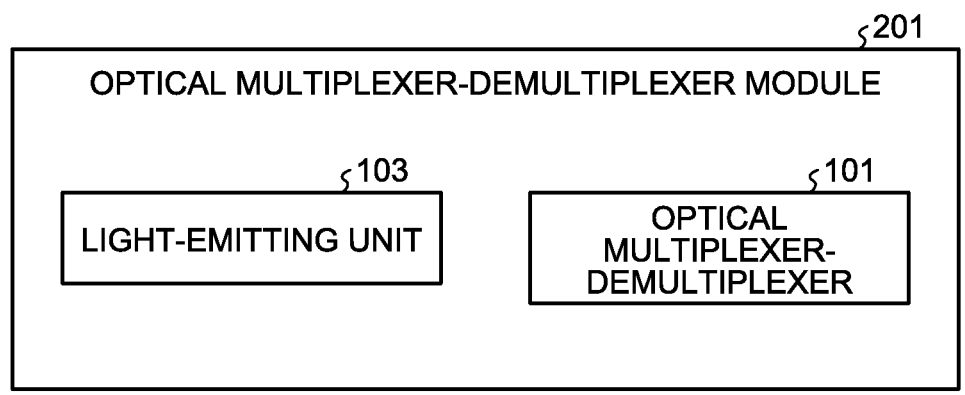
FIG. 11 is a diagram illustrating an example configuration of an optical multiplexer-demultiplexer module according to a tenth embodiment.

FIG. 11 is a diagram illustrating an example configuration of an optical multiplexer-demultiplexer module 201 according to the tenth embodiment. The optical multiplexer-demultiplexer module 201 includes the optical multiplexer-demultiplexer 101 and a light-emitting unit 103. The light-emitting unit 103 generates light and emits the light to the input waveguide 12 of the optical circuit 10 included in the optical multiplexer-demultiplexer 101. The optical multiplexer-demultiplexer module 201 is a module formed by encapsulating the optical multiplexer-demultiplexer 101 and the light-emitting unit 103 in a ceramic, metallic, or resin package.

Figure 12:
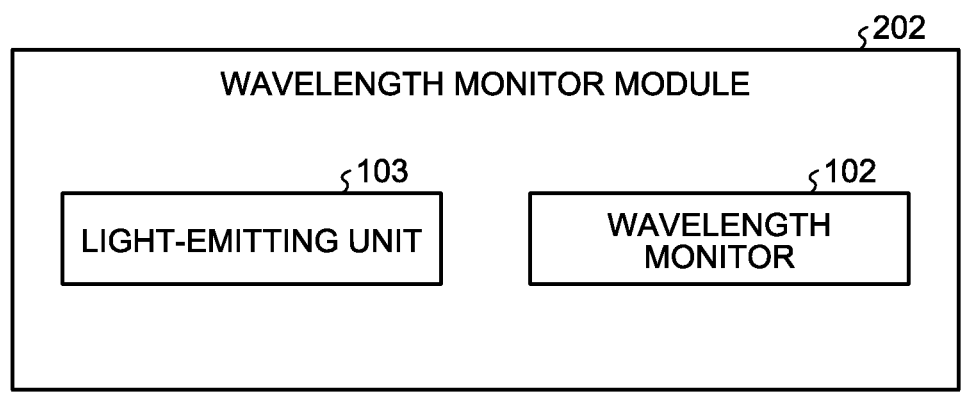
FIG. 12 is a diagram illustrating an example configuration of a wavelength monitor module according to the tenth embodiment.

FIG. 12 is a diagram illustrating an example configuration of a wavelength monitor module 202 according to the tenth embodiment. The wavelength monitor module 202 includes the wavelength monitor 102 and the light-emitting unit 103. The wavelength monitor module 202 is a module formed by encapsulating the wavelength monitor 102 and the light-emitting unit 103 in a ceramic, metallic, or resin package.

The light-emitting unit 103 may be configured to include a light-emitting element, such as an optical receptacle, and multiple lenses.

As described above, encapsulating the optical multiplexer-demultiplexer 101 or the wavelength monitor 102 to form a module provides various advantages such as ensuring airtightness, shock absorption, high portability, and easy connection to a transceiver.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 10, 10a, 10b, 10c, 10d optical circuit; 11, 11b, 11c chip unit; 12, 12b input waveguide; 13 coupler; 14, 14c, 14-1 to 14-5, 14b-1 to 14b-5 output waveguide; 15, 15b arrayed waveguide; 16, 16c electrode; 17, 18 heating electrode heater; 19 fixture unit; 20 cylindrical lens; 30 condenser lens; 40 arrayed waveguide; 41-1 to 41-5 waveguide; 50 etalon; 60 light-receiving element; 100, 100a, 100b, 100c, 100d optical scanning device; 101 optical multiplexer-demultiplexer; 102 wavelength monitor; 103 light-emitting unit; 151, 151b phase shifter portion; 152 waveguide portion; 153, 153c beam portion; 201 optical multiplexer-demultiplexer module; 202 wavelength monitor module.

The invention claimed is:

1. An optical circuit comprising:
an input waveguide serving as an optical transmission line;
an arrayed waveguide including a plurality of output waveguides serving as an optical transmission line;
a splitter to cause light input from the input waveguide to split and to output the light to the output waveguides of the arrayed waveguide;
an electrode capable of applying a voltage to each of the output waveguides of the arrayed waveguide; and
a chip to which the input waveguide, the splitter, and a portion of the arrayed waveguide are fixed, wherein the arrayed waveguide is divided into
a phase shifter portion capable of generating a predetermined phase difference between adjacent ones of the output waveguides,
a beam portion having a light output surface from which the output waveguides output light and having a cantilever structure that is not fixed by the chip, and
a waveguide portion between the phase shifter portion and the beam portion, and
the electrode is capable of applying positive and negative voltages to the beam portion of the arrayed waveguide such that positive and negative voltages are alternately applied to adjacent ones of the output waveguides.

2. The optical circuit according to claim 1, wherein the output waveguides in the phase shifter portion have an arc shape whose center is at a point on the chip.

3. The optical circuit according to claim 1, comprising:
a heating electrode heater to heat the output waveguides in the phase shifter portion.

4. The optical circuit according to claim 3, wherein the heating electrode heater has a portion for heating the output waveguides, the portion being shaped to have a different length for each of the output waveguides.

5. The optical circuit according to claim 1, wherein the beam portion has a shape of a perpendicularly curved waveguide in which the light output surface is perpendicular to the phase shifter portion and the waveguide portion that are fixed to the chip.

6. The optical circuit according to claim 1, comprising:
a fixture to fix the beam portion.

7. An optical scanning device comprising:
the optical circuit according to claim 1; and
a lens disposed in an output direction of the light output from the light output surface of the beam portion.

8. An optical multiplexer-demultiplexer comprising:
the optical scanning device according to claim 7, wherein the arrayed waveguide included in the optical circuit according to claim 7 is a first arrayed waveguide;
a condenser lens to condense light that passes through the lens according to claim 7; and
a second arrayed waveguide including a plurality of waveguides serving as a transmission line for light that passes though the condenser lens.

9. A wavelength monitor comprising:
the optical scanning device according to claim 7;
an etalon to transmit light that passes through the lens according to claim 7; and
a light-receiving element to receive light that passes through the etalon.

10. An optical multiplexer-demultiplexer module comprising:
the optical multiplexer-demultiplexer according to claim 8; and
a light emitter to generate light and to emit the light to the input waveguide of the optical circuit included in the optical multiplexer-demultiplexer, wherein the optical multiplexer-demultiplexer and the light emitter are encapsulated.

11. A wavelength monitor module comprising:
the wavelength monitor according to claim 9; and
a light emitter to generate light and to emit the light to the input waveguide of the optical circuit included in the wavelength monitor, wherein the wavelength monitor and the light emitter are encapsulated.

* * * * *